United States Patent [19]

Bergeron et al.

[11] Patent Number: 5,051,924

[45] Date of Patent: Sep. 24, 1991

[54] METHOD AND APPARATUS FOR THE GENERATION OF REPORTS

[76] Inventors: Larry E. Bergeron, 72 Coventry La., Trumbull, Conn. 06611; David B. Chamberlin, 11 Hunter Ridge Rd., Monroe, Conn. 06468; Emil F. Jachmann, 34 Harbor View Pl., Stratford, Conn. 06497; Jy-Hong J. Su, 14 Hunters La., Norwalk, Conn. 06850; Daniel F. Daly, 194 Barn Hill Rd., Monroe, Conn. 06468

[21] Appl. No.: 175,900

[22] Filed: Mar. 31, 1988

[51] Int. Cl.$^5$ .............................................. G10L 5/00
[52] U.S. Cl. .................................................. 364/513.5
[58] Field of Search .................................... 381/51–53, 381/41–46, 110; 364/200 MS File, 900 MS File, 513.5; 379/67–68, 71, 75, 88–89, 51–52; 369/24–25; 340/825.19; 434/112, 116

[56] References Cited

U.S. PATENT DOCUMENTS

| 4,602,129 | 7/1986 | Matthews et al. | 379/89 |
| 4,692,941 | 9/1987 | Jacks et al. | 381/52 |
| 4,763,252 | 8/1988 | Rose | 364/200 |
| 4,776,016 | 10/1988 | Hansen | 381/51 |
| 4,831,654 | 5/1989 | Dick | 381/52 |
| 4,980,845 | 3/1990 | Little | 364/513.5 |

FOREIGN PATENT DOCUMENTS 2192746  1/1988  United Kingdom .

OTHER PUBLICATIONS

Levinson et al., "A Task Oriented Conversational Mode Speech Understanding System", Bibliotheca Phonetica, No. 12, pp. 149–196, 1985.

Ciarcia, "Build Microvox Text-To-Speech Synthesizer", BYTE, 10/82, pp. 40–64.

Lin et al., "Text-To-Speech Using LPL Allophone Stringing", IEEE Trans on Comsumer Elec., vol. CE-27, 5/81, pp. 144–152.

Peckham, Jeremy; "Talking to Machines"; IEEE Review, Nov. 1988; pp. 385–388.

Peckham, Jeremy; "VODIS –A Voice Operated Data Base Inquiry System"; Speech Technology, Sep./Oct. 1986; pp. 56–61.

*Primary Examiner*—Emanuel S. Kemeny
*Assistant Examiner*—John A. Merecki
*Attorney, Agent, or Firm*—Robert H. Whisker; Melvin J. Scolnick; David E. Pitchenik

[57] ABSTRACT

A method and apparatus for generating, and storing for later retrieval, selected voice messages in response to selected verbal input trigger phrases. The voice signals including predetermined trigger phrases are transmitted from an input device such as a multiline telephone to a voice recognition system. The voice recognition system associates the trigger phrases with predetermined blocks of text message and in response to a sequence of trigger phrases, creates a report. The text is then output to a voice synthesizer system for the creation of synthetic voice signals corresponding to the full text of the report and the synthetic voice signals are output to a voice storage and forward system for later retrieval. The system also provides a printed copy of the full text of the report. In one embodiment of the system, an exception dictionary is provided which substitutes replacement words having a modified spelling for exception words whose pronunciation, as synthesized by the voice synthesizer, is not considered acceptable.

16 Claims, 8 Drawing Sheets

FIG. 4

202
DICTAPHONE GENERAL HOSPITAL
DEPARTMENT OF VOICE INTEGRATION
3191 BROADBRIDGE AVENUE
STRATFORD, CT 04597

206 2/10/1988  208 ARTHROGRAM:  210 212 RIGHT SHOULDER.

218 — 216
AFTER STERILE PREPARATION OF THE ANTERIOR ASPECT OF THE SHOULDER, A 20 GAUGE NEEDLE WAS INSERTED INTO THE JOINT. INJECTION OF 2 CC OF RENOGRAFIN AND 0.3CC OF EPINEPHRINE WAS MADE, FOLLOWED BY 10CC OF AIR. MULTIPLE VIEWS WERE OBTAINED WHICH INCLUDE FLUOROSCOPIC SPOT FILMS. THERE IS NO EVIDENCE OF ROTATOR CUFF TEAR. THE JOINT RECESSES ARE NORMAL. NO INTRAARTICULAR ABNORMALITIES ARE IDENTIFIED.
220

225 — 224 IMPRESSION: NORMAL EXAMINATION.

226 PATIENT I.D.: (4530)

200 M.N. HARRIS (4530) 11:34 2/10/1988

FIG. 5

DICTAPHONE EXCEPTION PRONUNCIATION UTILITIES- MODIFY/VIEW

| ORIGINAL WORD 3 | REPLACEMENT WORD |
|---|---|
| BILATERAL | BBUYYLATERAL |
| BILATERALLY | BBUYYLATEEREELLY |
| CECUM | CEECUMM |
| CEREBELLAR | SERAHH BELLAR |
| CEREBRAL | SREEB BRULL |
| CT | C.T. |
| DIGITAL | DIJATOL |
| DTPA | D.T.P.A. |
| ECHOS | EKKOES |
| ENEMA | EN NIMAH |
| FIBROCYSTIC | FUYBROOCYSTIC |
| FORAMINA | FORRAAMMIHNAA |

# METHOD AND APPARATUS FOR THE GENERATION OF REPORTS

BACKGROUND OF THE INVENTION

1. Field of the Invention

The present invention relates to a method and apparatus for storing and forwarding voice signals. More particularly, it relates to a system for storing and forwarding selected types of reports in the form of voice signals.

In many professional fields it is frequently necessary to generate reports. These records may be unique or may consist of selected, predetermined words, phrases, sentences, or paragraphs arranged in a predetermined format. Typical of such professions is radiology. Typically, a radiologist will examine an x-ray and prepare a written report about the patient's condition for review by the patient's primary physician (i.e. attending physician). The large majority of these reports take on substantially standard formats differing only in particulars such as the dimensions of abnormalities noted or particular conditions of the examination. Similar requirements for reports are found in the legal, insurance and other such professions.

In order to efficiently make use of their time and to benefit the hospitals with which they are associated, it is the common practice of radiologists to dictate their reports. In large modern hospitals these reports may be dictated on improved central digital dictation systems which allow access through a telephone or audio station by a number of authorized users, including the primary physicians of the patients. Use of such central dictation systems by the radiologists allows the primary physicians almost immediate access, by voice, to the radiologist's report, thereby eliminating the need to wait for the report to be transcribed. However, particularly in a large, busy hospital, such systems may create a backlog of recorded but untranscribed reports which introduces undesirable delays in the registration and filing of the written report. Further, in the case of radiologists with a heavy accent or speech impediment, primary physicians not familiar with the radiologists may have difficulty understanding the recorded report during listen access as provided by current central digital dictation systems Another approach to the problem of generating reports such as radiologists' reports has been the use of voice recognition systems. Such systems typically will recognize key words or phrases (hereinafter sometimes referred to as "trigger" phrases), and in response to these phrases, output preselected blocks of printed text. This selected text is output in a predetermined format to generate the printed report. Such systems have the advantage of providing an immediate printed report, but deprive others of immediate listen access to the reports; particularly from a remote location over the telephone network, since no voice record was generated.

2. Objects of the Invention

Thus, it is an object of the subject invention to provide a system wherein the contents of a report are promptly available to authorized, interested parties.

It is another object of the subject invention to provide a system which reduces the time required to produce a report.

It is another object of the subject invention to provide a system which standardizes the form of verbal reports.

It is still another object of the subject invention to provide a system which will increase the range of usefulness of voice recognition technology for the generation of reports.

BRIEF SUMMARY OF THE INVENTION

The above objects are achieved and the disadvantages of the prior art are overcome in accordance with the subject invention by means of a method and apparatus which include an input for voice signals, a recognition system for recognizing predetermined voice signals (hereinafter sometimes referred to as "trigger phrases"), a central dictation system for storing and retrieving voice signals, a synthesizer for synthesizing speech signals from text input and for outputting the synthesized voice to the storage and retrieval system, and a text memory for storing predetermined text messages. A control system is connected to the recognition system, the synthesizer and the text memory. The control system responds to the recognized trigger phrases to select particular text messages stored in the text memory and outputs the selected text messages to the synthesizer and controls the synthesizer to output synthesized voice signals corresponding to the selected text messages to the storage and retrieval system.

In accordance with the method of the subject invention, verbal reports are generated by first receiving spoken trigger phrases, then recognizing the trigger phrases and associating them with selected predetermined text messages, and then synthesizing voice signals corresponding to the text messages. In the preferred embodiment of the subject invention, the text messages are then stored for later retrieval. In a preferred embodiment of the subject invention a printer connected to the control system may be provided for generating printed copies of the selected text messages so as to provide an immediate printed report.

Those skilled in the art will recognize that embodiments of the subject invention advantageously provide a system that combines the rapid generation of routine reports and the capability of immediate creation of a printed copy of such reports with immediate access to verbal copies of the reports. Further, since the trigger phrases used to select particular portions of text messages are arbitrary, the system can compensate for accents and speech impediments since the voice signals corresponding to the text messages will be recorded in a uniform synthesized voice. Indeed, since the trigger phrases are completely arbitrary, the method and apparatus of the subject invention can effectively act as a translator producing text messages and corresponding voice signals in one language in response to trigger phrases spoken in another language.

Other objects and advantages of the subject invention will be apparent to those skilled in the art from consideration of the attached drawings and the Detailed Description of Preferred Embodiments set forth below.

BRIEF DESCRIPTION OF THE DRAWING

FIG. 4 is an illustration of a sample report produced in accordance with the subject invention.

FIG. 5 is an illustration of an exception dictionary used in the subject invention.

DETAILED DESCRIPTION OF THE PREFERRED EMBODIMENT

Figure 1:
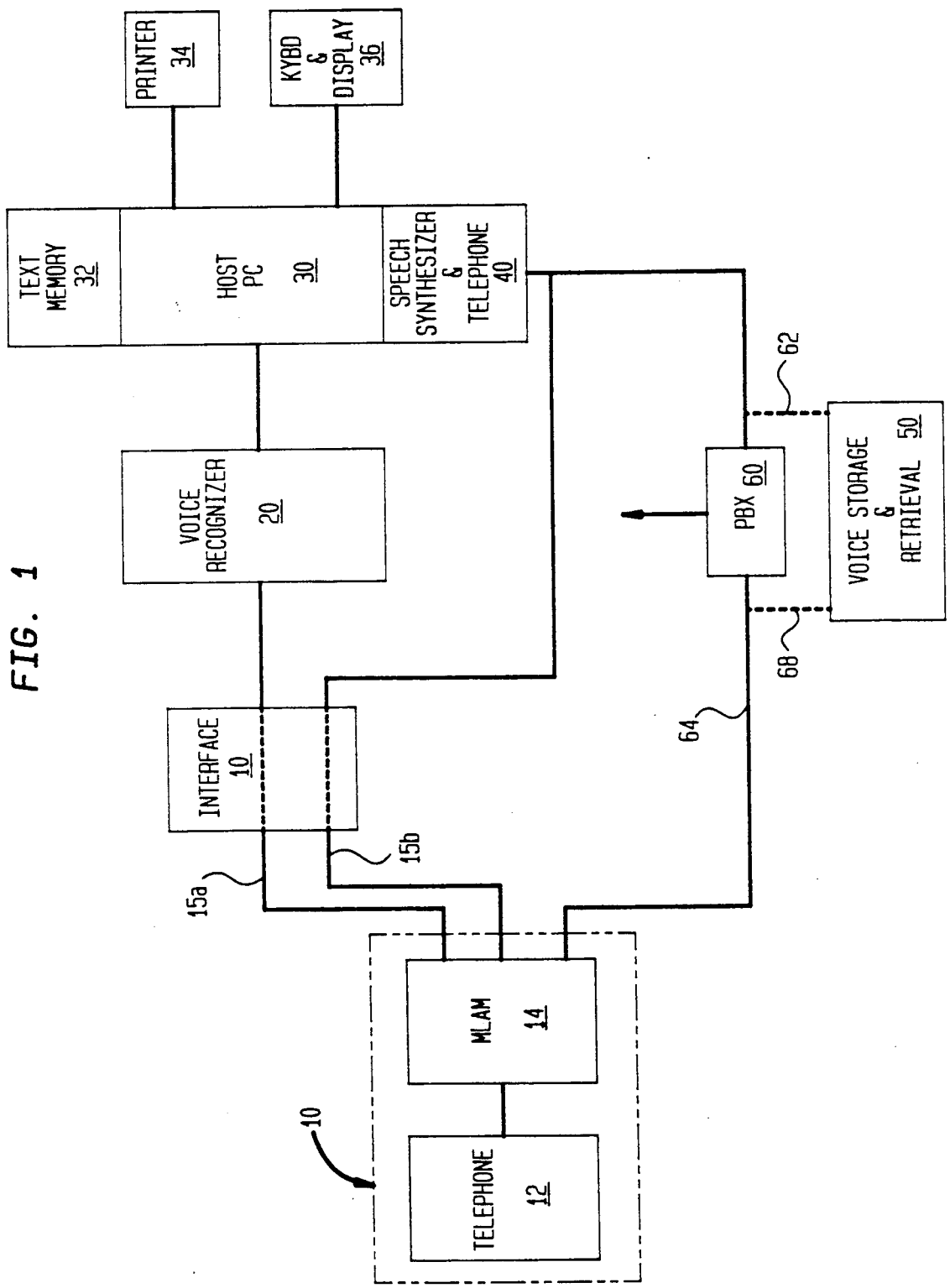
FIG. 1 is a schematic block diagram of an embodiment of the subject invention.

FIG. 1 shows a schematic block diagram of an embodiment of the subject invention. A conventional input 10 is provided for the input of voice signals. Preferably, input 10 comprises a multiline telephone 12 such as the telephone system marketed by the assignee of the present application under the trademark "Connexions" and including a Multi-Line Access Module 14 and having an optional dictation hand microphone. Suitable input means are described in the commonly assigned patent applications Ser. No. 894,549, filed: Aug. 8, 1986 for: TELEPHONE DEVICE AND METHOD FOR OPERATING A TELEPHONE DEVICE; and Ser. No. 101,301, filed: Sept. 25, 1987, for: MULTI-LINE ACCESS MODULE FOR TELEPHONE SET.

Input voice signals are connected by telephone line 15a to interface 16, which will be described further below. A second telephone line 15b is provided for output of synthesized voice signals to the user in a manner which will be described further below. (Other conventional input means such as a directly connected dictation microphone are within the contemplation of the subject invention.)

Line 15a is preferably a directly connected dedicated telephone line so as to provide a maximum bandwidth signal to voice recognizer 20; however, input of voice signals over the switched telephone network is within the contemplation of the subject invention.

Interface 16 converts the single-ended telephone signals to differential signals suitable for voice recognizer 20. Voice recognizer 20 is a conventional, commercially available voice recognition system such as the system marketed by Kurzweil Applied Intelligence Inc. of 411 Waverley Oaks Road, Waltham, Mass. 02154-8465 under the trademark VoiceRad. Such systems are designed to recognize selected vocabularies of spoken words and output digital signals identifying the identified spoken words to a host computer; in the present embodiment of the subject invention host pc 30. Voice recognizer 20 recognizes selected vocabularies and is a speaker-dependent system. That is, each user must train the system to recognize a vocabulary in his voice. Such speaker-dependent systems are believed preferable for applications such as the generation of radiological reports requiring a substantial vocabulary, and further allow selection of trigger phrases to be arbitrary so that a foreign born user might select trigger phrases in his native language, yet still produce reports in english, or any other selected language. However, for other applications, perhaps requiring a less extensive vocabulary, speaker-independent voice recognition systems would avoid the need for training; and such systems are within the contemplation of the subject invention. In general, various voice recognition systems are presently commercially available, such as the above described Kurzweil system, and a more detailed description of voice recognition technology is not believed necessary for an understanding of the subject invention.

Once trigger phrases are recognized by recognizer 20, digital signals identifying the recognized phrases are transmitted to host pc 30. In accordance with the subject invention, host pc 30 will incorporate report generation software for the generation of reports for particular applications. In a preferred embodiment of the subject invention, host pc 30 will incorporate the VoiceRad software for the generation of radiological reports. This software associates selected, identified trigger phrases with predetermined text messages stored in text memory 32; which memory may form part of the memory of host pc 30, and recognizes other identified trigger phrases as commands to select particular modes of operation, such as the generation of a particular type of report. Host pc 30 also controls voice recognizer 20 to define a limited vocabulary in accordance with the particular report selected and the point in the report reached. Thus, for example, after log-on the system will recognize that the user will first select the particular report and will control voice recognizer 20 to recognize only the trigger phrases associated with each of the particular types of reports. This recognition technique provides improved accuracy but is not considered a limitation of the subject invention per se and other recognition techniques are within the contemplation of the subject invention. Once a report is generated by a script of spoken trigger phrases, systems such as the VoiceRad system will output the selected text messages to printer 34 to provide a printed copy of the report. In order to provide greater flexibility in the generation of the report, the text is also output to keyboard and display 36 and a system user may modify the displayed text in an arbitrary manner using conventional word processing techniques. The software also provides a word-by-word mode where each input voice signal is associated with a single word or phrase so that the user may essentially dictate text through voice recognizer 20 and host pc 30. As noted above, systems such as the VoiceRad system are commercially available and a more detailed description of their operation is not believed necessary for an understanding of the subject invention. Once a report is completed, host pc 30 controls speech synthesizer 40 to convert the text of the report to synthesized voice signals and output these voice signals to a central digital dictation system for storage and retrieval. Such speech synthesizers are commercially available and preferably will be a system such as the system marketed by Speech Plus Inc. of Mountain View, Calif. under the trademark "Calltext 5000". Such systems receive a word as a sequence of digital signals, typically coded in ASCII, and generate a selected corresponding voice signal using digital signal processing techniques well known to those skilled in the art. Such systems also may include DTMF capabilities in order to access other systems over the telephone lines, as will be described more fully below (by DTMF herein is meant the well known dual tone, multi-frequency signals commonly used for signalling over the telephone network under the trademark "Touch Tone", or signals equivalent.) The synthesized voice signals are output to the central digital dictation system either through a conventional PBX 60 or over a dedicated phone line 62 or in any other suitable conventional manner. Once stored in the digital dictation system 50, the signals may then be immediately accessed by any authorized system user over the public telephone network through PBX 60, or through a private line connected in any suitable conventional manner, thus, providing immediate access to persons such as the primary physicians who may require prompt knowledge of a radiological report. Central dictation systems for the digital storage and retrieval of voice signals are well known and are described, for example, in commonly assigned co-pending patent application Ser. No. 013,303, filed: Feb. 10, 1987 for: DIGITAL DICTATION SYSTEM. Another suitable system is marketed under the trade name RTAS by the assignee of the subject invention. (RTAS is a trademark of Sudbury Systems, Inc. of Sudbury, Mass.). Such systems store voice signals in digital form for later retrieval, typically over the telephone network, by transcriptionists or other authorized users. Once an authorized user identifies a stored signal, a system will retrieve the signal, convert it to a analog voice signal and output it to the user. A more detailed description of the operation of such central digital dictation systems is not believed necessary for an understanding of the subject invention.

The system also provides for a third telephone line 64 to input device 10 so that a user may either listen to previously stored reports or dictate non-standard reports in a conventional manner. Line 64 may connect either through PBX 60, or through an optional direct connection 68 or may be connected in any other suitable conventional manner.

Figure 2:
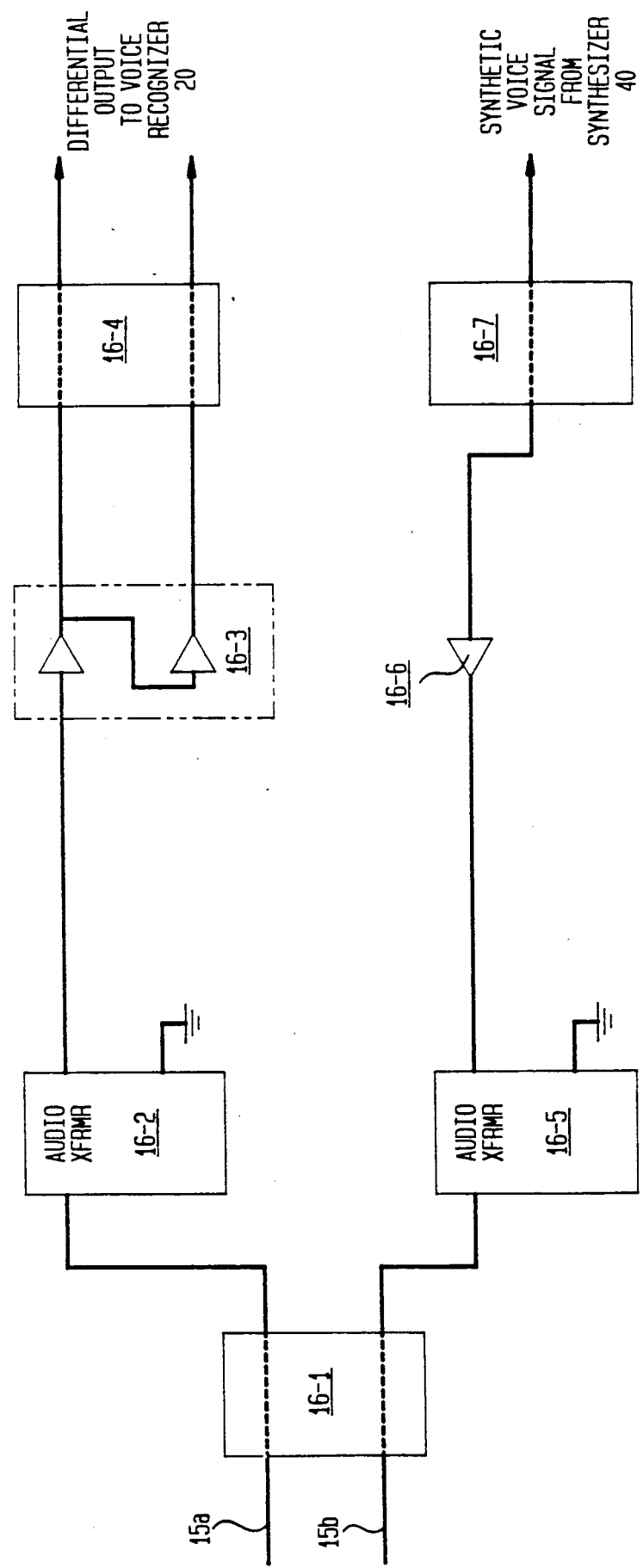
FIG. 2 is a schematic diagram of an optional interface between a telephone line and a voice recognition module used in embodiments of the subject invention.

FIG. 2 shows a more detailed schematic of interface 16. Two telephone lines 15a and 15b are connected from input 10 to jack 16-1 of interface 16. Line 15a is connected through audio transformer 16-2 to differential drive 16-3 to provide a double-ended signal for voice recognizer 20, to which it is connected through jack 16-4. Line 15b is connected through jack 16-1 and audiotransformer 16-5 to the output of amplifier 16-6 which receives a signal through jack 16-7 from the output of synthesizer 40. This line allows a user to listen to the synthetic voice signals generated in order to create an exception dictionary to improve the pronunciation of words included in the text messages stored in memory 32, as will be more fully described below.

Separate lines are provided to input 10 in order to prevent the coupling of synthetic speech back through voice recognizer 20. However, it is within the contemplation of the subject invention to modify the control of voice recognizer 20 so that it will not be operational when speech is being output to input 10 and to use a single bidirectional line.

Figure 3A:
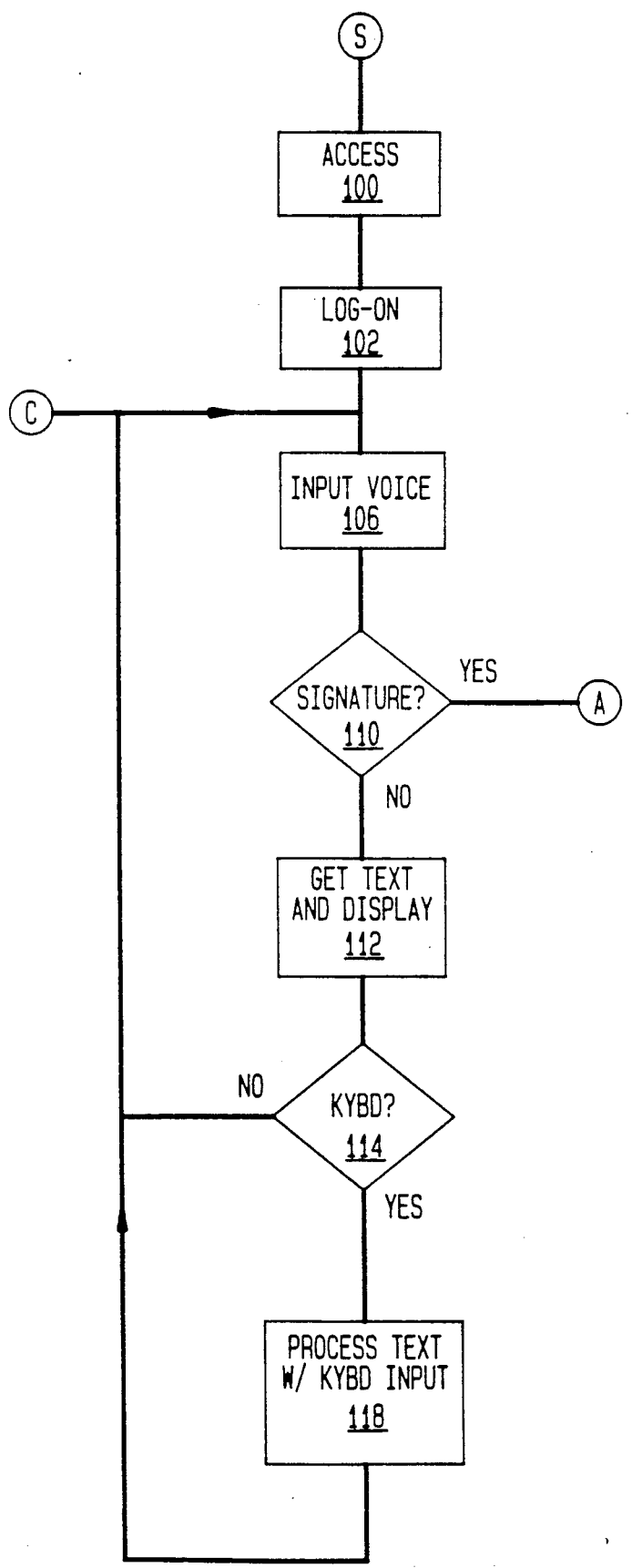
FIGS. 3a–3c are a flow chart of the operation of the embodiment of the subject invention shown in FIG. 1.
Figure 3B:
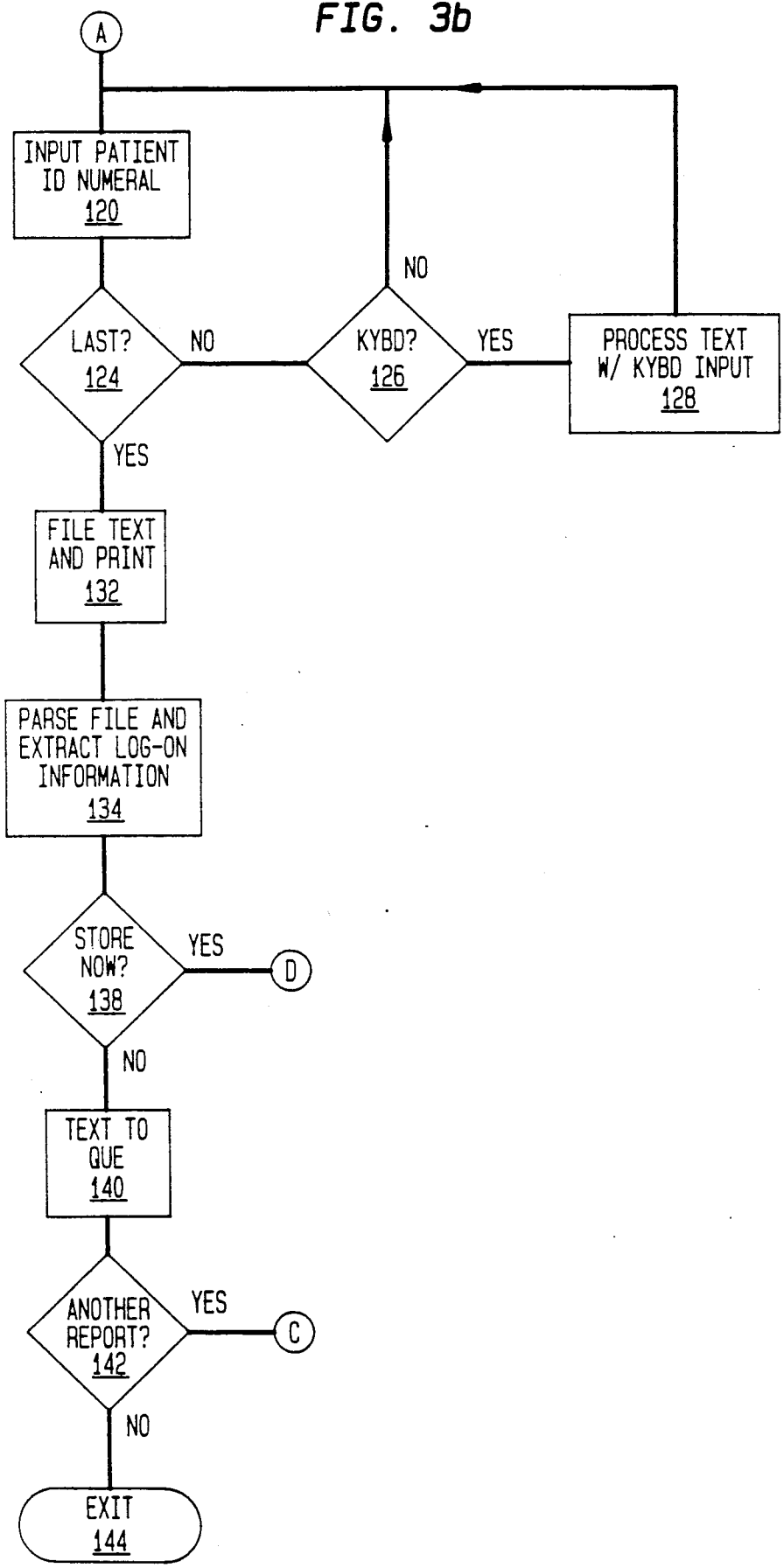
Figure 3C:
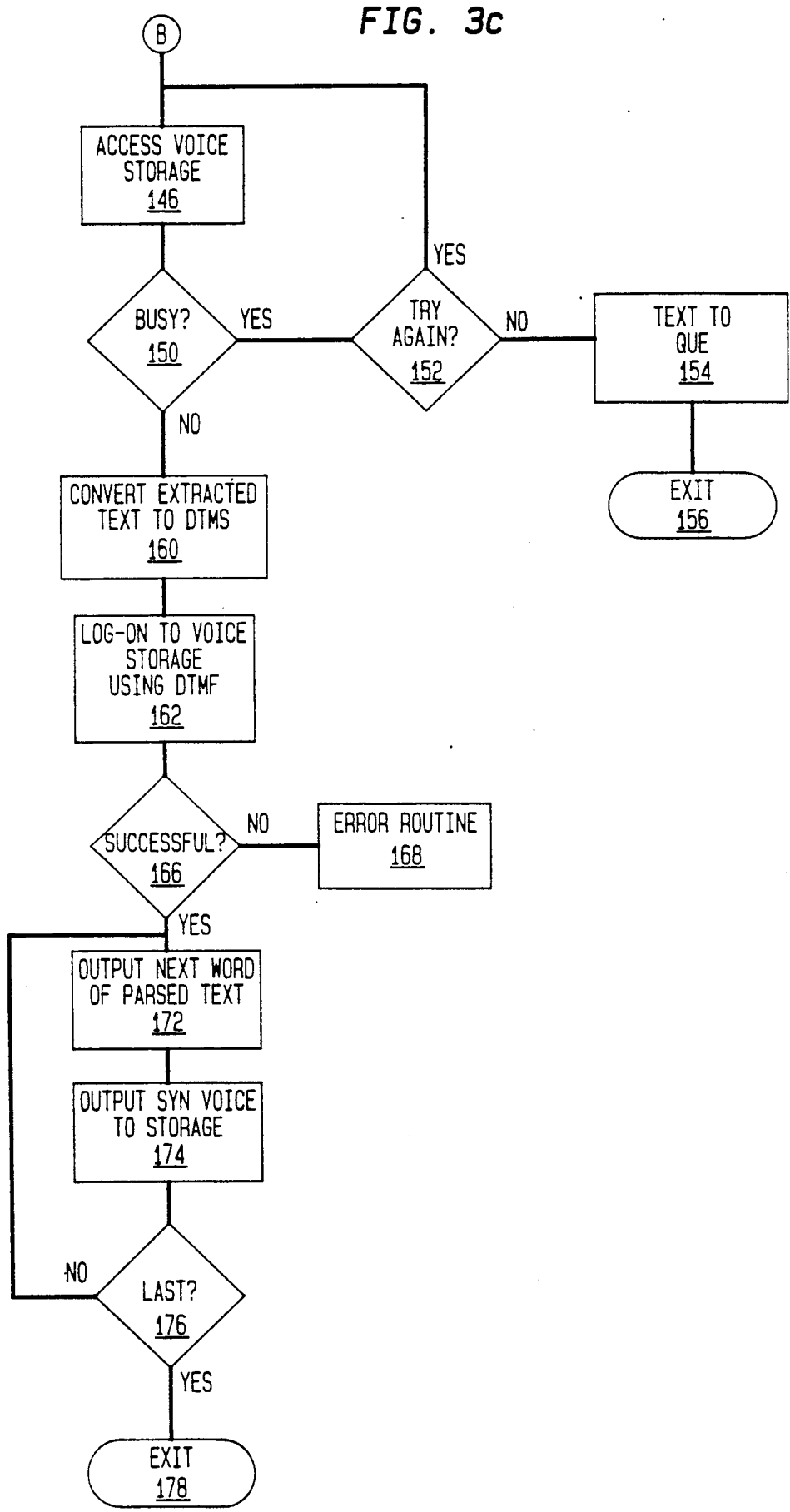

FIGS. 3a-3c show a flow chart of the operation of the system of FIG. 1. At 100 a user of the system selects line 15a on input 10 to access voice recognizer 20 and host pc 30. The user then logs on through keyboard 36 to identify himself to the system. Log on through keyboard 36 is necessary so that the system may select the appropriate user's vocabulary for which the system has been trained. Once the user has identified himself, the system then performs voice tests and microphone checks to adjust the recognition algorithm of recognizer 20 for current conditions. Since the system has selected the user's preestablished vocabulary, the user may then complete the log-on to establish the date and type of report verbally, as will be more fully described below.

At 106 the user begins to input voice signals, and at 110 the system tests to determine if the voice signal is "signature". By "signature" herein is meant a trigger phrase which signals to the system that the report is complete except perhaps for additional identification, to be provided as will be described below.

If signature is not recognized, at 112 the system retrieves a predetermined text message associated with a recognized trigger phrase and stored in memory 32 and displays it on keyboard and display 34. At 114 the system checks to determine if the operator is modifying the displayed text through the keyboard. If not, the system returns to 106 for further voice input. Otherwise, at 118 the text is modified in accordance with standard word processing technique and the system then returns to 106 for further voice input.

In another embodiment of the subject invention editing may be verbal, using dictation controls such as "fast forward" and "rewind" to position and "insert" to provide for verbal modification of the displayed text.

If at 110 the system detects "signature" the system goes to A of FIG. 3b and at 120 the user may verbally input numerals of a patient ID number or other information which may be used to identify the report for later retrieval. At 124 the system checks to determine if it is the last numeral and if it is not, at 126 and 128 the system determines if the operator wishes to modify the text through the keyboard in the manner described above.

Once the last numeral of the patient ID is input, at 132 the system files the text of the completed report and prints the report on printer 136, providing an immediate printed copy for the user; either directly or through a facsimile device to a remote location.

At 134 the system parses the file and extracts information for log-on to dictation system 50. As will be more fully described below, in parsing the text the system searches through each word of the text of the completed report to determine if any words are included in an exception dictionary which forms the part of the system. When located, exceptions are replaced by replacement words associated with the exception words in the exception dictionary. These replacements allow improved pronunciation of the voice signals synthesized by synthesizer 40 and the substitution of alternative phrases in the verbal and printed report.

At 134 the system also scans the report to extract information necessary to log-on to dictation system 50. This would include the identification of the author and of the patient so that system 50 can properly file the recorded voice report and might also include other useful information such as identification of the type of report.

At 138 the system then checks to determine if the report is to be stored in dictation system 50 now, or is to be stored later. If the report is to be stored later, at 140 the text is placed in a queue for later storage and at 142 the system determines if the user wishes to input another report. If so, the system returns to C in FIG. 3a and if not, the system exits at 144. This capability will allow a user who has a number of reports to generate to generate all the reports without waiting for each one to be stored. Once all reports are generated at a later time the system will store the queued reports in essentially the same manner as will be described further below.

If the voice is to be stored, the system goes to B in FIG. 3c and at 146 accesses dictation system 50. That is the system controls synthesizer 40 to dial up, or otherwise access, dictation system 50 in a conventional manner substantially similar to that used in dial-up modems operating under computer control. At 150 the system tests for busy, and if storage system 50 is not available, determines if it should try again at 152. Once the system determines it should no longer try again, the text of the report is sent to the queue at 154 and the system exits at 156.

If the system is not busy, at 160 the system converts the information extracted from the report at 134 (e.g. author ID and patient ID) into DTMF signals for transmission over the phone lines to dictation system 50, and then at 162 logs-on to storage system 50 using the DTMF tones.

At 166 the system determines if log-on has been successful, and if not enters an error routine at 168. If log-on is successful at 172, the system outputs the next word of the parsed text to voice synthesizer 40 and outputs the synthetic voice to dictation system 50 at 174. At 176 the system tests to determine if it is the last word of the text, and if not, loops back through 172 to continue outputting the text. Once the last word of text is output, the system logs-off and exits at 178.

Thus, a synthetic voice signal corresponding to the full text of the report is stored on voice storage and retrieval system 50 for immediate access by authorized, interested parties in a conventional manner.

(Those skilled in the art will recognize that particular trigger phrases may also be recognized as commands in more complex applications to, for example, select a blank in a predefined format, without significant change to the above described operation.)

FIG. 4 shows an illustration of a sample report generated in accordance with the subject invention. At log-on the author identification, time and date 200 are established along with standard heading 202. The user then dates the report by speaking the trigger phrase TODAY, causing the text for the current date to be entered into the message. Alternatively, the user might input another date as numerals.

At 208 the user inputs the trigger phrase ARTHROGRAM which is entered into the report to identify the type of report. The system also is able to then determine the appropriate format for the report and the appropriate subsets of the vocabulary to be used at each point in the report.

At 210 and 212 the user inputs the trigger phrases RIGHT and SHOULDER which cause the text "right" and "shoulder" to be entered into the message as a further identification of the type of report.

The user then enters the trigger phrase ROUTINE causing the text for paragraph 216 to be entered into the report. The system then goes to the blank 218, and indicates that a value needs to be provided by displaying the cursor at the blank in the text on the display 34. The user then inputs the trigger phrase 2 and the command trigger phrase GO TO NEXT, causing a numeral 2 to be entered into the blank in the report text and the cursor to move to blank 220. The user then inputs the trigger phrase FLUROSCOPY causing the text at 220 to be entered, and then inputs the command trigger phrase EXIT FILL-INS. The user then inputs the trigger phrase NORMAL causing the text at 224 to be input into the report and then inputs the command trigger phrase SIGNATURE followed by the trigger phrases 4, 5, 3, and 0 causing text 225 and patient ID 226 to be entered and completing the report. The report is now ready for listen access by the primary physician in the same manner a conventionally dictated report would be accessed by a transcriptionist.

Figure 6:
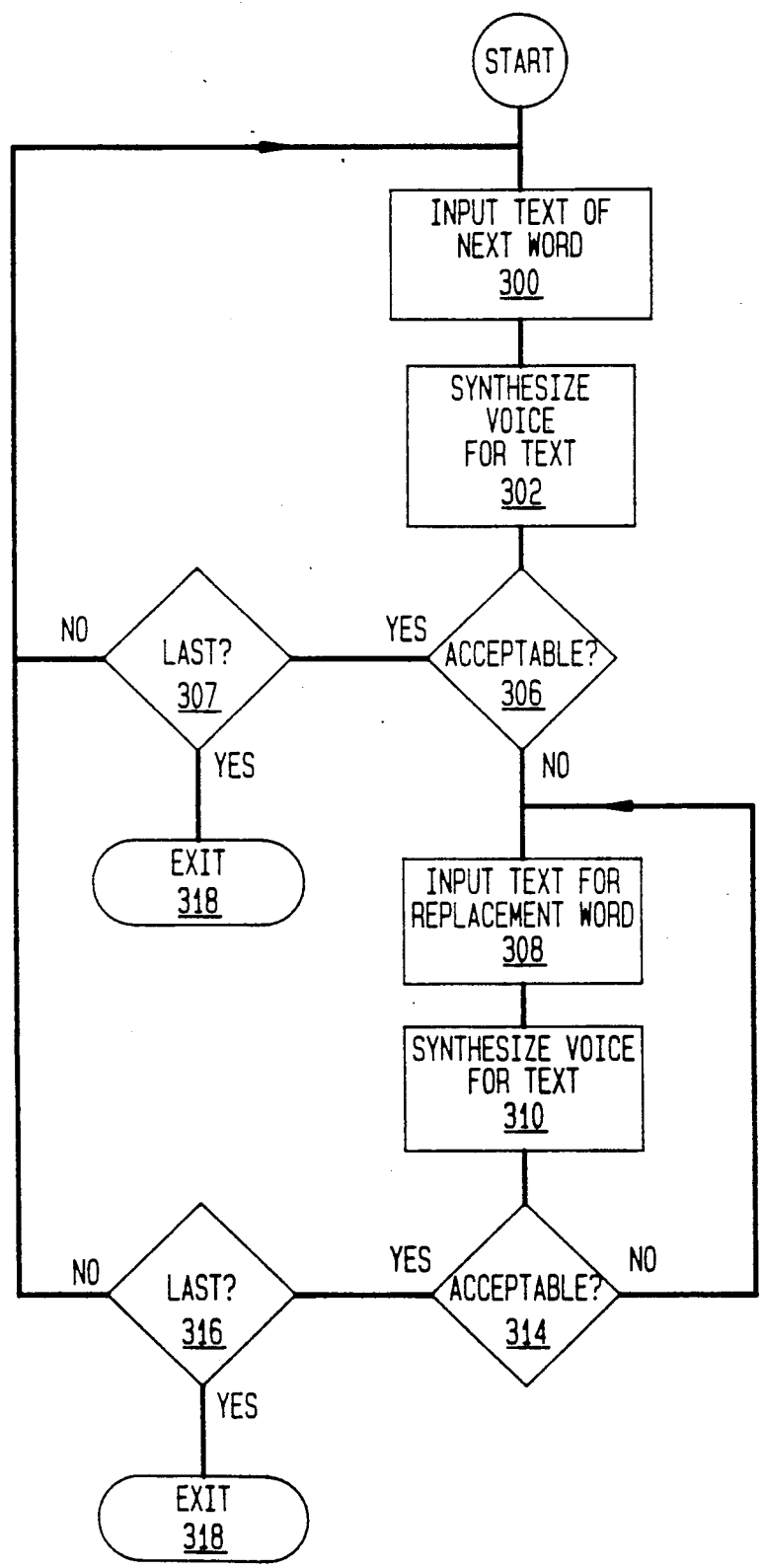
FIG. 6 is a flow chart of the generation of an exception dictionary.

FIGS. 5 and 6 show the establishment of an exception dictionary in accordance with the subject invention. Since voice synthesizer 40 is not limited to a fixed vocabulary, it attempts to generate synthetic voice signals by an analysis in accordance with a predetermined algorithm operating on the spelling of the text input. Of course, it is well known that the pronunciation of english words frequently bears little or no resemblance to their spelling. Thus, it is known with systems such as the "Calltext" to modify the spelling in the text in order to achieve a more acceptable pronunciation. However, in the subject invention it is essential that the printed text provided be correctly spelled. Accordingly, in accordance with the subject invention an exception dictionary as shown in FIG. 5 listing those words whose pronunciation, based on the correct spelling, is not considered acceptable by the user, and associated replacement words having modified spelling which provides a more acceptable pronunciation, and which are substituted during the parsing described above at 134.

FIG. 6 shows a flow chart of the creation of an exception dictionary in accordance with the subject invention. At 300 the text of the next word whose pronunciation may not be acceptable is input through the keyboard, and at 302 that text is used to synthesize a voice signal which is played back to the user over telephone line 15b. At 306 the user determines if the voice signal corresponding to the correct spelling is acceptable, and if it is, and if at 307 there are more words, returns the system to 300 to input the text of the next word. If there are no more words, the system exits at 318.

If the pronunciation however is not acceptable, the user inputs a modified text for a replacement word at 308 and at 310 listens to the synthesized voice for the modified text. At 314 the user determines if this pronunciation is acceptable, and if it is not, returns to 308 to further modify the text. If it is acceptable, the system determines if that is the last word and, if it is not, returns to 300, and if it is exits at 318.

Those skilled in the art will recognize that other embodiments of the subject invention will be readily apparent from consideration of the above description and the attached drawings. Accordingly, limitations on the subject invention are only to be found in the claims set forth below.

What is claimed is:

1. Apparatus for generation of verbal reports comprising:
   (a) input means for inputting voice signals;
   (b) recognition means for recognizing predetermined ones of said input voice signals as trigger phrases;
   (c) synthesis means for synthesizing speech signals from text messages and for outputting said synthesized speech signals;
   (d) text memory means for storing predetermined text messages;
   (e) storage and retrieval means for storing said synthesized speech signals for later retrieval of identified speech signals, by authorized users, from remote locations; and
   (f) control means, connected to said recognition means, said synthesis means, and said text memory means, for:
   (f1) responding to said trigger phrases to select particular ones of said text messages from said text memory means;
   (f2) establishing a signal path between said synthesis means and said storage and retrieval means; and
   (f3) inputting said selected text messages to said synthesis means and controlling said synthesis means to output synthesized speech signals corresponding to said input text messages for storage by said storage and retrieval means.

2. Apparatus as described in claim 1 wherein said control means further comprises means for extracting selected information from the text of said selected text messages, converting said extracted information to dual tone multi-frequency (DTMF) signals and outputting said DTMF signals to said storage and retrieval means to identify said output synthesized speech signals.

3. An apparatus described in claim 1 wherein said trigger phrases are selected by a user of said apparatus.

4. An apparatus as described in claim 1 further comprising printing means responsive to said control means for printing copies of said input text messages.

5. An apparatus as described in claim 1 further comprising parsing means for modifying the spelling of words in said text messages so as to modify said synthesized speech signals.

6. An apparatus as described in claim 5 wherein said parsing means further comprises a predetermined exception dictionary, said dictionary including a list of selected words and alternative spellings for each of said selected words, said parsing means substituting the corresponding alternative spelling for each occurrence of one of said selected words in said selected text messages.

7. Apparatus as described in claim 1 wherein said selected text messages comprise radiological reports.

8. Apparatus as described in claim 1 further comprising means for editing said selected text messages before said selected text messages are input to said synthesis means.

9. A method of generating verbal reports comprising the steps of:

(a) receiving spoken trigger phrases;
(b) recognizing said trigger phrases and associating said recognized trigger phrases with selected ones of predetermined text messages;
(c) synthesizing speech signals corresponding to said selected text messages and
(d) storing said synthesized speech signals for later retrieval of identified speech signals, by authorized users, from remote locations.

10. The method of claim 9 wherein said trigger phrases are selected by a user of said method.

11. The method of claim 9 further comprising the step of printing a copy of said selected text messages.

12. The method of claim 9 further comprising the step of modifying the spelling of selected words in said text messages prior to synthesizing said speech signals.

13. The method of claim 9 further comprising the step of extracting information identifying said synthesized speech signals from said selected text messages and storing said synthesized speech signals in accordance with said extracted information.

14. The method of claim 13 wherein said selected text messages comprise radiological reports.

15. The method of claim 9 wherein said selected text messages comprise radiological reports.

16. The method of claim 9 comprising the further step of editing said predetermined text messages prior to synthesizing said speech signals.

* * * * *